(12) United States Patent
Kaushik et al.

(10) Patent No.: US 11,265,718 B2
(45) Date of Patent: Mar. 1, 2022

(54) DETECTING IOT SECURITY ATTACKS USING PHYSICAL COMMUNICATION LAYER CHARACTERISTICS

(71) Applicant: SOPHOS LIMITED, Oxfordshire (GB)

(72) Inventors: Anil Kaushik, Karnataka (IN); Stutz Daniel, Baden-Wurttemberg (DE)

(73) Assignee: Sophos Limited, Abingdon (GB)

( * ) Notice: Subject to any disclaimer, the term of this patent is extended or adjusted under 35 U.S.C. 154(b) by 121 days.

(21) Appl. No.: 16/612,752

(22) PCT Filed: May 10, 2018

(86) PCT No.: PCT/GB2018/051265
§ 371 (c)(1),
(2) Date: Nov. 11, 2019

(87) PCT Pub. No.: WO2018/206965
PCT Pub. Date: Nov. 15, 2018

(65) Prior Publication Data
US 2020/0169890 A1    May 28, 2020

(30) Foreign Application Priority Data
May 12, 2017 (IN) .............................. 201711016744

(51) Int. Cl.
*H04W 12/121* (2021.01)
*H04L 29/06* (2006.01)

(52) U.S. Cl.
CPC ....... *H04W 12/121* (2021.01); *H04L 63/0876* (2013.01); *H04L 63/1425* (2013.01)

(58) Field of Classification Search
CPC ... H04W 12/12; H04W 12/79; H04W 12/121; H04W 4/70; H04L 63/16; H04L 63/0876; H04L 63/1425; H04L 63/1408; H04L 63/1441
See application file for complete search history.

(56) References Cited

U.S. PATENT DOCUMENTS

| | | | |
|---|---|---|---|
| 2004/0107219 A1* | 6/2004 | Rosenberger | H04L 63/1408 |
| 2004/0162995 A1* | 8/2004 | Muaddi | H04W 12/12 726/23 |
| 2014/0359777 A1* | 12/2014 | Lam | G06F 21/577 726/25 |
| 2015/0189511 A1 | 7/2015 | Lapidous | |
| 2015/0324616 A1 | 11/2015 | Alarabi | |
| 2015/0350233 A1* | 12/2015 | Baxley | G07C 9/22 726/1 |

(Continued)

FOREIGN PATENT DOCUMENTS

| WO | WO 2015/187726 | 11/2015 |
|---|---|---|
| WO | 2015187726 | 12/2015 |

OTHER PUBLICATIONS

IPO, First Examination Report mailed for IN application No. 201711016744, dated Feb. 27, 2020, 7 pages.

(Continued)

*Primary Examiner* — Robert B Leung
(74) *Attorney, Agent, or Firm* — IP Spring

(57) ABSTRACT

Methods, systems and computer readable media for protecting networks and devices from network security attack using physical communication layer characteristics are described.

20 Claims, 5 Drawing Sheets

(56) References Cited

U.S. PATENT DOCUMENTS

| | | | | |
|---|---|---|---|---|
| 2015/0350914 A1* | 12/2015 | Baxley | .................... | H04L 63/02 |
| | | | | 726/11 |
| 2015/0358337 A1* | 12/2015 | Keller | ..................... | G06F 11/00 |
| | | | | 726/23 |
| 2016/0036833 A1* | 2/2016 | Ardeli | ................. | H04L 63/1408 |
| | | | | 726/22 |
| 2016/0098561 A1* | 4/2016 | Keller | ................... | G06F 21/554 |
| | | | | 726/24 |
| 2016/0127931 A1* | 5/2016 | Baxley | ................. | H04W 12/08 |
| | | | | 455/67.16 |
| 2016/0294858 A1* | 10/2016 | Woolward | .............. | H04L 63/20 |
| 2018/0124096 A1* | 5/2018 | Schwartz | ............ | H04L 63/1425 |
| 2018/0144139 A1* | 5/2018 | Cheng | ................... | G06F 21/577 |
| 2018/0191775 A1* | 7/2018 | Watson | ................. | G06N 20/00 |

OTHER PUBLICATIONS

PCT, "International Search Report in International Application No. PCT/GB2018/051265", 4 Pages.

PCT, "Written Opinion", in International Application No. PCT/GB2018/051265, 6 Pages.

Sharma Rajesh K et al. "Advances on Security Threats and Countermeasures for Cognitive Radio Networks: A Survey", IEEE Communications Surveys & Tutorials, vol. 17, No. 2, May 19, 2015, pp. 1023-1043.

* cited by examiner

DETECTING IOT SECURITY ATTACKS USING PHYSICAL COMMUNICATION LAYER CHARACTERISTICS

RELATED APPLICATIONS

This application is a national phase of International Application No. PCT/GB2018/051265, filed May 10, 2018 which claims priority to, Indian Patent Application No. 201711016744, filed May 12, 2017, the contents of which are incorporated herein by reference in their entirety.

TECHNICAL FIELD

Embodiments relate generally to wireless computer networks, and more particularly, to methods, systems and computer readable media for protecting networks and devices using physical communication layer characteristics (e.g., wireless communication characteristics).

BACKGROUND

The Internet of Things (or IoT) has gained significant popularity and continues to grow. Securing a mission critical network such as a network of IoT devices remains a concern. There have been reports of security attacks and misuse of IoT devices. For example, there have been reports of unauthorized users sending spam from a refrigerator.

One risk posed by IoT systems is that unrelated systems may be connected on the same network and if an attacker gains unauthorized access to one IoT device, that access could be used to attack other devices on the same or on different networks.

Also such connected networks may be disconnected in terms of management and applied polices. So, applying a security policy at a given network segment may help at a certain level, but it may not be feasible to secure a whole ecosystem of IoT devices/objects.

Security has been identified as a challenge in increased adoption of IoT devices. There can be at least two key technical issues or problems in terms of security for IoT devices. First, IoT devices (e.g., a refrigerator, microwave oven, etc.) may be managed by people who are not experts in networking or security. Some IoT devices may not even have a user interface, so management (including application of security policies, updating of software to patch vulnerabilities, security policies, etc.) may not occur regularly or at all. Second, IoT devices in general may not be primarily network devices and hence due to computing constraints or for other reasons may not include sophisticated infrastructure for security (e.g., firewall capability, intrusion detection, secure updating capability, etc.).

These technical limitations of IoT devices may permit an attacker to disable and impersonate, or "spoof" an existing system and start sending data into a network on behalf of the spoofed system. A cloud service that is the recipient of such data may find it difficult to determine that the data is coming from a malicious source.

Further, as noted above, some IoT devices may have limited resources such as memory and processing power and may not be able to perform security protocols to protect against security attacks on the device. It may be helpful to detect security attacks to a network via an IoT device (or via an unauthorized device masquerading as an authorized IoT device) at a wireless access point or other device with more resources relative to the IoT device and/or in a better position within the system to perform detection of security attacks against the network via an IoT device.

Embodiments were conceived in light of the above mentioned needs, problems and/or limitations, among other things.

SUMMARY

In general, some implementations may use physical communication layer characteristics of a device (e.g., radio frequency (RF) characteristics) and optionally higher-level characteristics (e.g., data transfer characteristics, etc.) to detect an attempt to breach network security or a network intrusion.

One or more embodiments may include methods, systems and computer readable media for detecting an IoT security attack using physical communication layer characteristics. In some implementations, a method may include determining a reliability index value of an Internet-of-Things (IoT) device coupled via a wireless link to a network, and monitoring RF characteristics of the IoT device to obtain current RF characteristics. The method may also include comparing the current RF characteristics to baseline RF characteristics. The method may further include adjusting the reliability index value to indicate greater reliability when there is a match between the current RF characteristics and the baseline RF characteristics based on the comparing. The method may also include adjusting the reliability index value to indicate lesser reliability when there is not a match between the current RF characteristics and the baseline RF characteristics based on the comparing. The method may further include performing an action to reduce a potential threat of the IoT device to the network when the reliability index value exceeds a threshold value.

The method may also include determining baseline radio frequency (RF) characteristics of the IoT device, and updating the baseline RF characteristics during a time period. The method may further include determining that the IoT device is stationary while determining baseline radio frequency characteristics, and determining that a media access control (MAC) address of the IoT device indicates that the IoT device is a stationary device.

Determining the IoT device is stationary may include accessing a database to determine if a database record corresponding to a media access control (MAC) address of the IoT device indicates that the IoT device is stationary.

In some implementations, determining baseline RF characteristics may include obtaining baseline RF characteristics from stored data based on a type of the IoT device. In some implementations, determining baseline RF characteristics can include determining a rate of change of one or more RF characteristics.

The action may include routing network traffic for the IoT device through a network security device. Performing the action may include disconnecting the IoT device from the network.

The current and/or baseline RF characteristics may include one or more of a received signal strength indicator (RSSI) value, an angle of signal arrival, waveform characteristics, frequency power characteristics, power save characteristics, service set identifier (SSID) of the network the IoT device is connected to, an access point (AP) the IoT device is connected to, a basic service set identifier (BSSID) associated with the IoT device, a data transmission rate of the IoT device, and data burst rate of the IoT device.

Some implementations may include a system comprising one or more processors coupled to a computer readable medium having stored thereon software instructions that, when executed by the one or more processors, cause the one or more processors to perform operations. The operations may include determining a reliability index value of an Internet-of-Things (IoT) device connected via a wireless link to a network, and monitoring RF characteristics of the IoT device to obtain current RF characteristics. The operations may also include comparing the current RF characteristics to baseline RF characteristics.

The operations may further include adjusting the reliability index value to indicate greater reliability when there is a match between the current RF characteristics and the baseline RF characteristics based on the comparing. The operations may also include adjusting the reliability index value to indicate lesser reliability when there is not a match between the current RF characteristics and the baseline RF characteristics based on the comparing. The operations may further include performing an action to reduce a potential threat of the IoT device to the network when the reliability index value exceeds a threshold value.

The operations may also include determining baseline radio frequency (RF) characteristics of the IoT device, and updating the baseline RF characteristics during a time period. The operations may further include determining that the IoT device is stationary while determining baseline radio frequency characteristics, and determining that a media access control (MAC) address of the IoT device indicates that the IoT device is a stationary device.

Determining the IoT device is stationary may include accessing a database to determine if a database record corresponding to a media access control (MAC) address of the IoT device indicates that the IoT device is stationary. Determining baseline RF characteristics may include obtaining baseline RF characteristics from a table based on a type of the IoT device. Determining baseline RF characteristics may include calculating baseline RF characteristics according to a formula.

The action may include routing network traffic for the IoT device through a network security device. Performing the action may include disconnecting the IoT device from the network. The RF characteristics may include one or more of a received signal strength indicator (RSSI) value, an angle of signal arrival, waveform characteristics, frequency power characteristics, power save characteristics, service set identifier (SSID) of the network the IoT device is connected to, an access point (AP) the IoT device is connected to, a basic service set identifier (BSSID) associated with the IoT device, a data transmission rate of the IoT device, and data burst rate of the IoT device.

Some implementations may include a nontransitory computer readable medium having software instructions stored thereon that, when executed by one or more processors, cause the one or more processors to perform operations. The operations may include determining a reliability index value of an Internet-of-Things (IoT) device connected via a wireless link to a network, and monitoring RF characteristics of the IoT device to obtain current RF characteristics. The operations may also include comparing the current RF characteristics to baseline RF characteristics.

The operations may further include adjusting the reliability index value to indicate greater reliability when there is a match between the current RF characteristics and the baseline RF characteristics based on the comparing. The operations may also include adjusting the reliability index value to indicate lesser reliability when there is not a match between the current RF characteristics and the baseline RF characteristics based on the comparing. The operations may further include performing an action to reduce a potential threat of the IoT device to the network when the reliability index value exceeds a threshold value.

The operations may also include determining baseline radio frequency (RF) characteristics of the IoT device, and updating the baseline RF characteristics during a time period. The operations may further include determining that the IoT device is stationary while determining baseline radio frequency characteristics, and determining that a media access control (MAC) address of the IoT device indicates that the IoT device is a stationary device.

DETAILED DESCRIPTION

Figure 1:
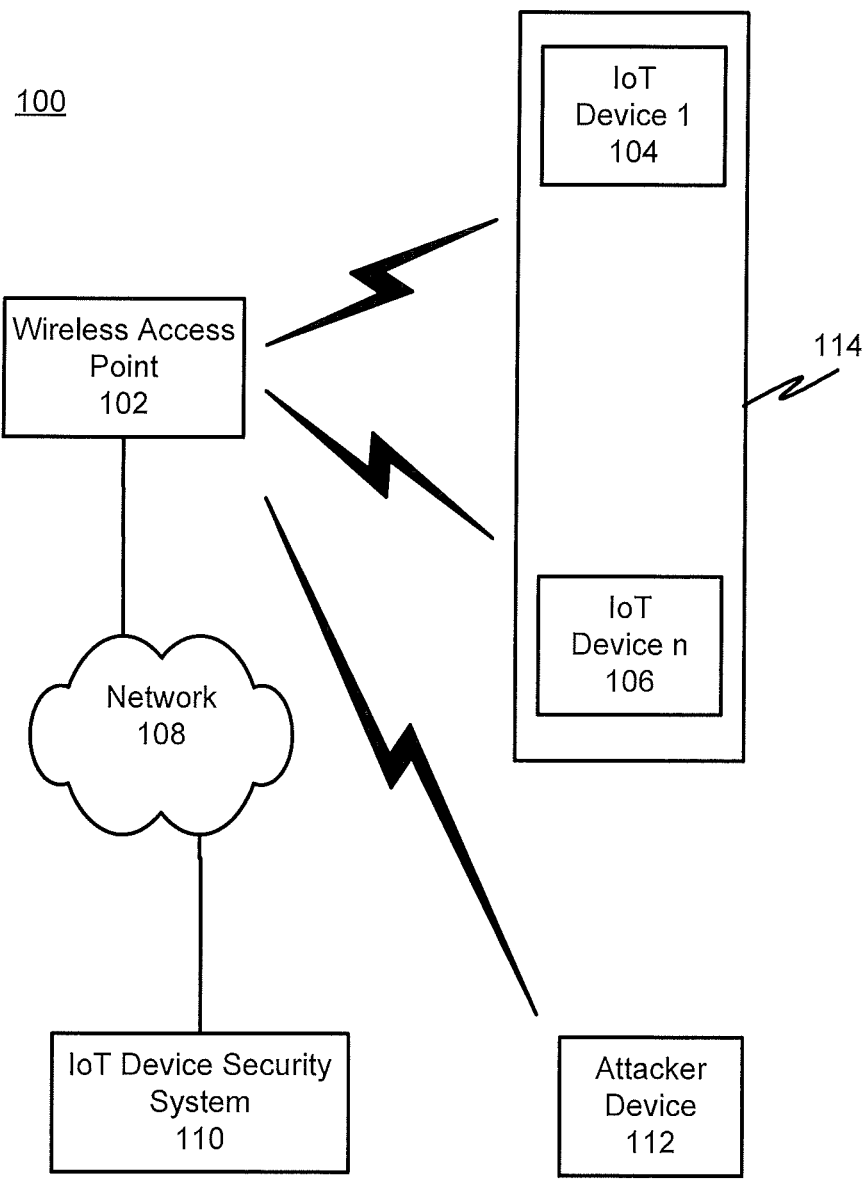
FIG. 1 is a diagram of an example IoT wireless network environment in accordance with some implementations.

In general, some implementations may use a wireless network (e.g., 802.11 networks, Wi-Fi, Bluetooth, etc.) system to determine whether an IoT device is a malicious device. Implementations may calculate a reliability index for a corresponding IoT device. The reliability index may represent a measure of the reliability of an IoT device in terms of identity. For example, the higher the reliability index, the greater likelihood that the data coming from the IoT device may be trusted as coming from an authorized IoT device or source. A lower reliability index may indicate an IoT device that may be compromised or malicious.

Some implementations may include a method that begins with determining baseline RF characteristics (i.e., an RF fingerprint) of an IoT device. A Wi-Fi system may be used to calculate reliability index based on the baseline RF characteristics in term of RF link attributes. The baseline may be dynamic, for example, a system implementing the method may continue to adjust the baseline over a period of time (e.g., minutes, hours, days, weeks, etc. depending on the application).

The reliability index may be determined by comparing current RF characteristics of an IoT device with the baseline characteristics. When the characteristics match, the reliability index value may be maintained or increased. When the characteristics do not match, the reliability index may be lowered.

Examples of RF characteristics include: received signal strength indicator (RSSI) value of an IoT device as measured by an access point (applicable to devices which are stationary in nature like Refrigerator, microwave oven etc), angle of signal arrival (which may be typically constant for stationary devices), waveform characteristics, frequency power characteristics, power save characteristics, service set identifier (SSID) connected, access point (AP) and basic service set identifier (BSSID) connected, data rate used, and data burst rate, etc.

In some implementations, one or more actions may be performed based on the reliability index value. For example, if the reliability index is below a given threshold, the system may disconnect the device. If the reliability index is within a given range (e.g., the threshold is a range that extends between two values on the reliability index scale) the system may divert traffic from the device to a firewall, restrict traffic to other devices, notify a firewall or security management facility, etc.

Some implementations may include determining RF signal characteristics from a stationary device (e.g., a refrigerator) do not change much, but RF signal characteristics frequently vary for non-stationary devices. Minor deviations from baseline (e.g., angle of arrival) for a stationary device may remain same most of the time. Some implementations may include determining a rate of change of one or more RF signal characteristics. If a rate or change for one or more RF signal characteristics meets a baseline (e.g., if the rate of change is below a threshold value), the reliability index may be calculated accordingly.

Different parameters could be given different weights for use in reliability index calculations. For example, reliability index values may be low for some characteristics, but higher for other characteristics (e.g., the SSID could have a high reliability index).

In some implementations, rules may be configured for determining a reliability index threshold for a given device and network environment. In some implementations, device data may be transmitted along with its corresponding reliability index value. Another system could receive the data and corresponding reliability index value and react accordingly (e.g., provide alarm indication, send disconnection event, ignore data, reconfigure, etc.). In another example, parameters that are typically more stable may be weighted more highly than parameters that may change more often, and thus a change in a typically more stable parameter (e.g., BSSID) may have a greater impact on reliability index. In another example, for a stationary device, physical layer characteristics may be weighted higher so that a change in one of the physical layer characteristics may result in a change to the reliability index. Weighting of parameters may also vary based on time of day (e.g., working hours), day of week (e.g., weekend versus weekday), etc.

In some implementations, the reliability index may be directly based on RF characteristics. Low deviation from baseline may be an indication of high reliability, and high deviation from baseline may indicate low reliability. For example, to attempt to spoof a stationary device, which may have relatively stable physical layer characteristics, an attacker device may not be able to stay in the same location and may have to move from location to location resulting in a lowered reliability index.

RF characteristics may be determined by a wireless network Access point (AP). By determining RF characteristics at the AP, it may not be feasible for an attacker to replicate or send a signal in such a way that the RF characteristics match with the device the attacker is attempting to attack (e.g. man in the middle or impersonation attack). The reliability index and the factors that go into the reliability index calculation for a given device form a probabilistic identification of the wireless station or device.

Some implementations may include a reliability index including factors evaluated at a higher layer in network communications (e.g., on HTTPS connections), where the system may extract features and build a baseline over feature characteristics. Some implementations could include a combination of physical layer characteristics and higher layer characteristics (e.g., data characteristics, connection characteristics such as HTTPS, etc.). Some implementations may include using additional features from other levels of a communication layer (e.g., other information about a station) in the reliability index calculation and monitoring. Some features may include jitter, inter packet arrival gap variation, or other features. While higher level features may be used, physical layer characteristics may be especially useful for reliability index purposes as physical features (e.g., RF characteristics) may be dependent on device location or other physical factors and therefore difficult to spoof or emulate.

A baseline of characteristics may be obtained by averaging observed values over a period of time. Normal movement of objects could be compensated for, e.g., by averaging or adjusting characteristics values over time. Some implementations may include utilizing a beamforming technique (e.g., a targeted signal is sent towards an IoT device to help provide good RF characteristics). An AP may send beamforming signals and the AP gets feedback from device (e.g., metrics of reception). Once the device responds, a security system may determine the RF characteristics (e.g., response to the focused beam). Later, the AP may probe the device using the beamforming technique and evaluate the response. In such cases, an attacker attempting to attack via a spoofing device may not even receive the beamformed signal or may receive a different beamformed signal as the spoofing device may be in a different location or have different receiver characteristics than the IoT device being spoofed. Characteristics that may be measured using the beamforming technique include angle of arrival, RSSI on subcarrier level, waveform shape and magnitude, etc. and may be measured by the receiver (e.g., in the AP) and may be unique to the receiver.

In some situations, baselines could be time dependent. For example, some devices (e.g., 2.4 GHz devices) may receive interference from other devices in the physical environment, such as microwaves, wireless phones, etc. To compensate for spectral interference, the radio of the AP may scan from time to time, take measurements at different times and may use a combination or selection from multiple measurements for the baseline or to compare to the baseline. For example, the system may determine that the baseline at a time or times, e.g., during the night, when interference from wireless phones and microwaves may be lower, may be a more accurate baseline for certain devices.

The AP may process data itself (e.g., via an integrated IoT security application) or send it to an external device (e.g., a cloud-based IoT security system), security facility, etc. For example, characteristics measurements may be sent to a cloud-based IoT security system, which monitors for baseline deviation and indicates to a corresponding AP when a device has a reliability index value below a threshold, for example.

For IoT devices having baseline characteristics that tend to vary frequently or by a large amount, the system may indicate that characteristics for a good reliability index cannot be measured. In some cases, a beamforming technique may be used to measure response to the beamforming signal to see if improved baseline stability may be achieved. If so, then the baseline characteristics for the reliability index may be based on the beam forming technique.

Some implementations may include real-time (or near real-time) measurement on multiple potentially confusing devices (e.g., devices having RF or other characteristics that may cause the devices to be confused with each other by an AP or other system), but physical characteristics (e.g., characteristics in response to a beamforming technique) may provide unique identification of the device. In these situations, an implementation may wait for beamform feedback and use beamforming to establish or to reestablish a baseline for the IoT device in question.

In some implementations having more than one access point, RF characteristics may be determined at each access point, a baseline established at each access point, and a reliability index determined based on information from one or one or more access points. A reliability index from each access point may be used to generate a combined reliability index, and the combined reliability index used to determine the reliability of a given IoT device. Other devices in addition to access points (e.g., devices that include sufficient RF technology such as other wireless endpoint devices or other wireless networking devices) may be used to determine RF characteristics.

In some implementations, an access point and multiple IoT devices with RF measurement capability are used to take measurements of other IoT or other devices present in a networked environment. By distributing the IoT devices with measurement capability and access point(s) in various locations in the protected environment, readings of RF characteristics for each protected device may be more precise and thus, the network may be more difficult to attack.

In addition to, or as an alternative to, RF characteristics, higher level network traffic characteristics could be used in the calculation of the reliability index. For example, client characteristic examples based on network traffic may include:
- Number of in/out packets
- Number of in/out bytes
- In/out packet jitter (min, max, avg)
- Min/Max/Avg/STD packets across in/out flows
- Avg time-to-live (TTL) value across in/out flows
- Min/Min/Avg/STD size of in/out packet
- transmission control protocol (TCP) initial window size
- TCP window scaling factor
- TCP maximum segment size
- secure socket layer (SSL) handshake parameters (version, supported algorithms)
- Max/Min/Avg/STD throughput across in/out flows
- Min/Max/Avg/STD Number of bursts across in/out flows
- Frequency of keep alive packets Where network connections have two flows each (e.g., in, out) and the direction may be defined by the initiator of a connection, where "out" is going from the initiator to the remote end of the connection and "in" is the reverse direction. In the above example, Avg is mean, and STD is standard deviation.

FIG. 1 is a diagram of an example IoT wireless network environment 100 in accordance with some implementations. The environment 100 includes a wireless access point (AP) 102, a first IoT device 104, a second IoT device 106, a network 108, an IoT device security system 110, and an attacker device 112.

In operation, the IoT device security system 110 calculates a reliability index for each IoT device (104, 106) based on physical communication layer characteristics (e.g., RF characteristics) of each corresponding IoT device. The RF characteristics for the IoT devices may be detected by the AP 102. If the reliability index value for a given device falls below a threshold, the IoT device may be prevented from accessing the network 108. The threshold can include a value scaled to a given scale, such as 0-1. In some implementations, the threshold could include a range of values.

The method of detecting IoT security attacks is described below in connection with FIG. 2.

It will be appreciated that the IoT device security system 110 may be a separate device or integrated into another device, such as the wireless access point 102. The IoT devices may share a physical location 114 (e.g., within a building), while the attacker device 112 may have a different physical location. The baseline characteristics of the IoT devices (104, 106) may include beam-forming characteristics, which may not be matched by the attacker device due to the attacker device being in a different location.

Figure 2:
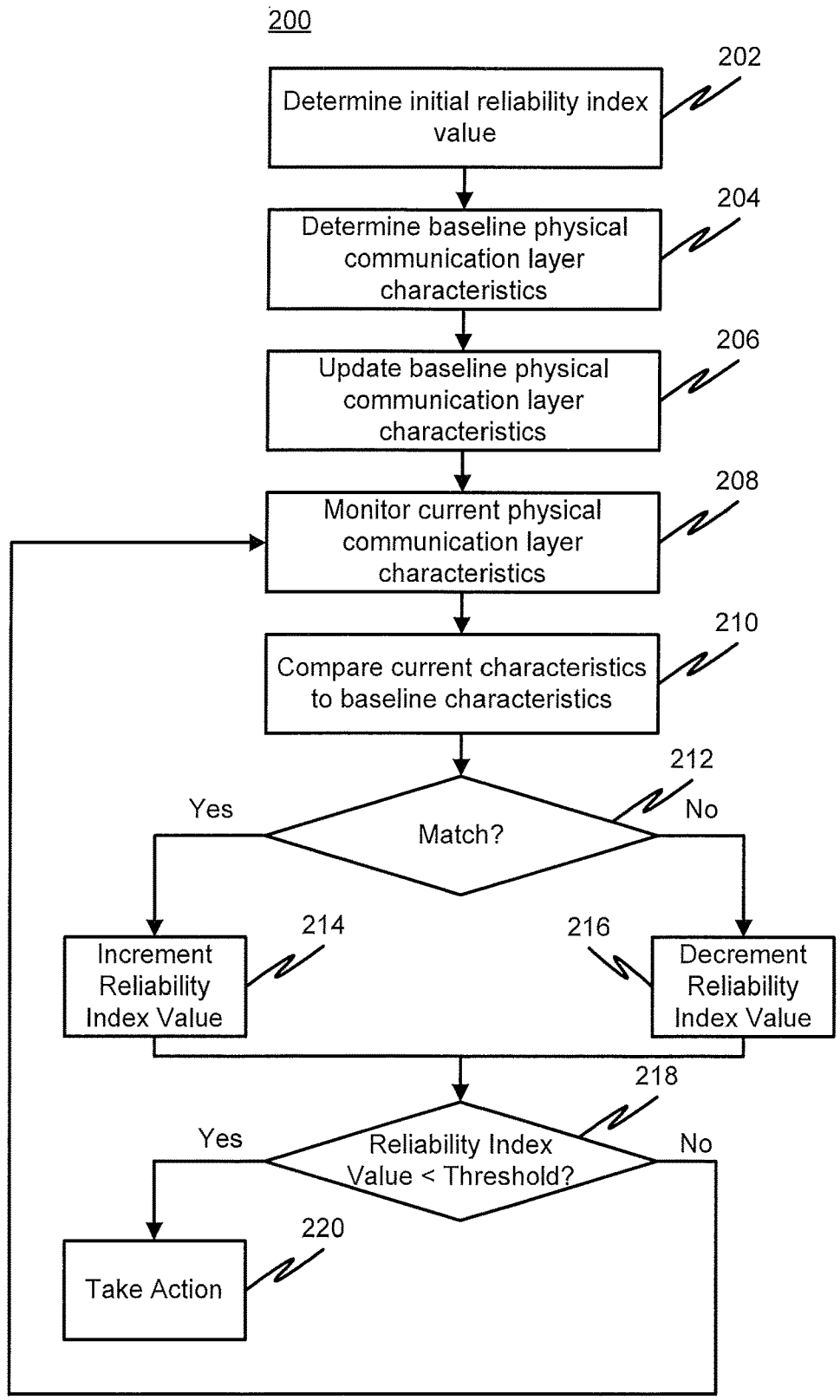
FIG. 2 is a flowchart showing an example method for detecting an IoT security attack using physical communication layer characteristics in accordance with some implementations.

FIG. 2 is a flowchart showing an example method 200 to detect an IoT security attack using physical communication layer characteristics in accordance with some implementations. The method begins at 202, where an initial reliability index value is determined for an IoT device. This initial value may be a starting value (e.g., 0 or some other value) and/or may be based on device type or other information. For example, the initial value may be set to a threshold value of the reliability index (see, e.g., step 218). A new device may start with a somewhat low reliability index, but one that is high enough to permit the device to have access. Then, over time, the reliability index for the new device may be adjusted based on detected parameters as discussed herein. In another example, the BSSID may provide an indication of a manufacturer of a device or other details (e.g., chipset) and that information may be used to set an initial reliability index value. For example, a device from a manufacturer that is rated high for security may be assigned a higher initial reliability index value, than a device from an unknown manufacturer, or a manufacturer that is not rated high. The reliability index can also be adjusted initially (or shortly after device start up) based on a heartbeat signal or other periodic communication from the device. Also, the initial reliability index value may be based on determining whether the device includes some form of endpoint protection. In yet another example, information characteristics from device communication or about device (e.g., heartbeat, data within communication messages, determination that the device is a managed device, operating system of the device, IP stack being used by the device, DHCP implementation being used by the device, SSL/TLS library being used by the device, etc.) may be combined with one or more physical layer characteristics to determine a reliability index value. The information characteristics of a device can be compared with information characteristics from other same or similar devices. Alternatively, determining that the device is a managed device, has endpoint protection, etc., may permit the system to determine a reliability index for the device that may rely on few if any physical layer characteristics. An initial period of evaluation can be established for a device in which the system monitors and measures the device characteristics in order to determine a reliability index value. The method continues to 204.

At 204, baseline physical communication layer characteristics are determined. For example, a wireless access point (e.g., 102) may determine baseline RF characteristics of an IoT device (e.g., 104 or 106). The baseline characteristics may be determined by measuring characteristics over a given period of time. Also, baseline characteristics may be correlated with a day of the week or time of day. The method continues to 206.

At 206, the baseline physical communication layer characteristics may be optionally updated. The updating may include adjusting baseline communication layer characteristics based on characteristics measurements made over time. For example, a wireless access point may measure RF characteristics of an IoT device over time and adjust the baseline RF characteristic values to reflect the measured values over time (e.g., determine mean or median values of characteristics, etc.). The method continues to 208.

At 208, current physical communication layer characteristics may be monitored. For example, a wireless access point may monitor current RF characteristics of an IoT device (e.g., the wireless access point may collect current measurements for the characteristics used in the baseline measurement of the IoT device). The method continues to 210.

At 210, the current characteristic values may be compared to the baseline characteristic values. For example, the current RF characteristics of an IoT device may be compared to the baseline RF characteristics values for that device. The method continues to 212.

At 212, a security system (e.g., 110) determines whether the current characteristic values match the baseline characteristics values. Here, matching may include determining a value representing how similar current and baseline values are, whether values are within a given range of each other, whether values match exactly, etc. The type of matching used may be selected based on the type of characteristics being measured, whether the characteristic typically varies, and how that characteristic may vary over time. Further, an overall matching may be determined which may include determining whether a certain number or percentage of individual characteristics match. For example, if 10 characteristics are being monitored as part of the reliability index, a match may be determined when 6 or more of the individual characteristics are determined to match.

Also, a match may be determined by comparing a reliability index value calculated based on the current characteristic values and a reliability index value calculated from the baseline characteristic values. The individual characteristics making up the reliability index may be weighted to emphasize or deemphasize given characteristics based on relative importance in determining reliability or security of a device. If it is determined that the characteristics match, the method continues to 214. If there is not a match, the method continues to 216.

At 214, the reliability index may be adjusted (e.g., incremented) based on the matching to indicate increasing confidence in the IoT device based on the reliability index. The method continues to 218.

At 216, the reliability index may be adjusted (e.g., decremented) based on the matching to indicate decreasing confidence in the IoT device based on the reliability index. The method continues to 218.

At 218, the reliability index may be compared to a threshold value. The threshold value may be a predetermined threshold value or may be a dynamically calculated threshold value based on the baseline characteristics determination, type of device, or other factor. The threshold may represent a level below which the security of the IoT device would be in question and an action may need to be taken. The threshold may represent a level below which the security of the IoT device would be convicted as compromised. If the reliability index value is less than the threshold, the method continues to 220. If the reliability index value is at or above the threshold value, the method continues to 208.

At 220, an action may be taken based on the reliability index falling below the threshold. For example, actions include limiting the access to the network for the IoT device having the reliability index below the threshold. An action also may include preventing the IoT device access to the network by blocking communication to and from the IoT device at a wireless access point, for example. Another action may be to quarantine the IoT device until confirmation from another system or user indicates that the device is safe. Another action may include providing an alert to another system or to a user interface indicating that the reliability index for an IoT device has fallen below the threshold. Yet another action can include notifying other devices in the network to not communicate with device. An action can include directing the traffic from the device to a specific system for analysis. Another action could include causing a more detailed inspection of traffic from the device (e.g., examine parameters more closely with modified ranges, examine additional parameters, etc.). As a reliability index falls, a first action could be taken when the reliability index falls below a first threshold (e.g., alerts, deeper inspection of traffic, etc.). As the reliability index continues to fall below a second threshold, a second action could be taken (e.g., instructing other devices to not communicate with suspect device, etc.). Other additional threshold levels and actions could also be used. The method may stop at 220 for a device that has a reliability index value below the threshold. Alternatively, the method may proceed to 204 to determine a new baseline for the device when such action is authorized by another system or user. A system may use data collected from devices as training data for a machine learning model that could then be used to make inferences or to classify data collected from devices.

It will be appreciated that one or more of 202-220 may be repeated, performed in a different order or performed periodically. For example, step 206 may performed periodically in order to update the baseline characteristics over time to account for any changes that may be occurring and adjust to those changes. Also, in the case of a reliability index falling below the threshold, the baseline characteristics may need to be recalculated by proceeding to step 204.

Figure 3:
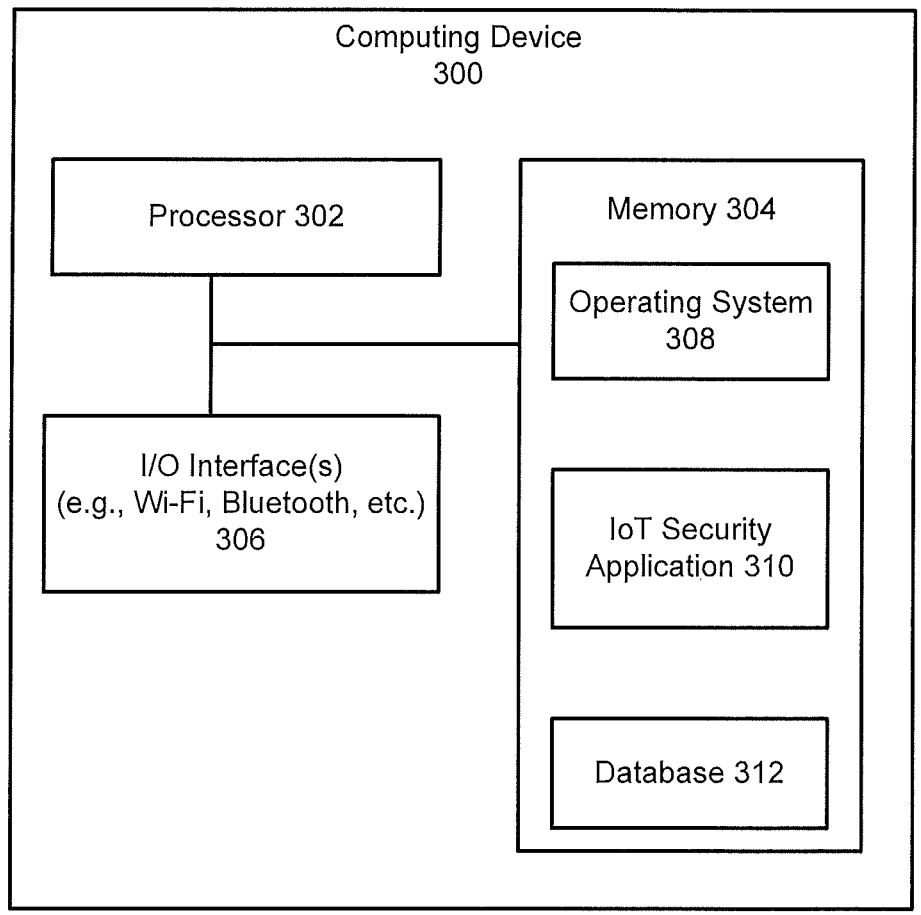
FIG. 3 is a diagram of an example computing device configured for detecting an IoT security attack using physical communication layer characteristics in accordance with at least one implementation.

FIG. 3 is a diagram of an example computing device 300 in accordance with at least one implementation. The computing device 300 includes one or more processors 302, nontransitory computer readable medium or memory 304, I/O interface devices 306 (e.g., wireless communications, etc.) and a network interface 308. The computer readable medium 304 may include an operating system 308, an IoT security application 310 for detecting an IoT security attack using physical communication layer characteristics and a data section 312 (e.g., for storing baseline data, reliability index data, etc.).

In operation, the processor 302 may execute the application 310 stored in the computer readable medium 304. The application 310 may include software instructions that, when executed by the processor, cause the processor to perform operations for detecting an IoT security attack using physical communication layer characteristics in accordance with the present disclosure (e.g., performing one or more of 202-220 described above).

The application program 310 may operate in conjunction with the data section 312 and the operating system 308. The device 300 may communicate with other devices (e.g., a wireless access point) via the I/O interfaces 306.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

Figure 4:
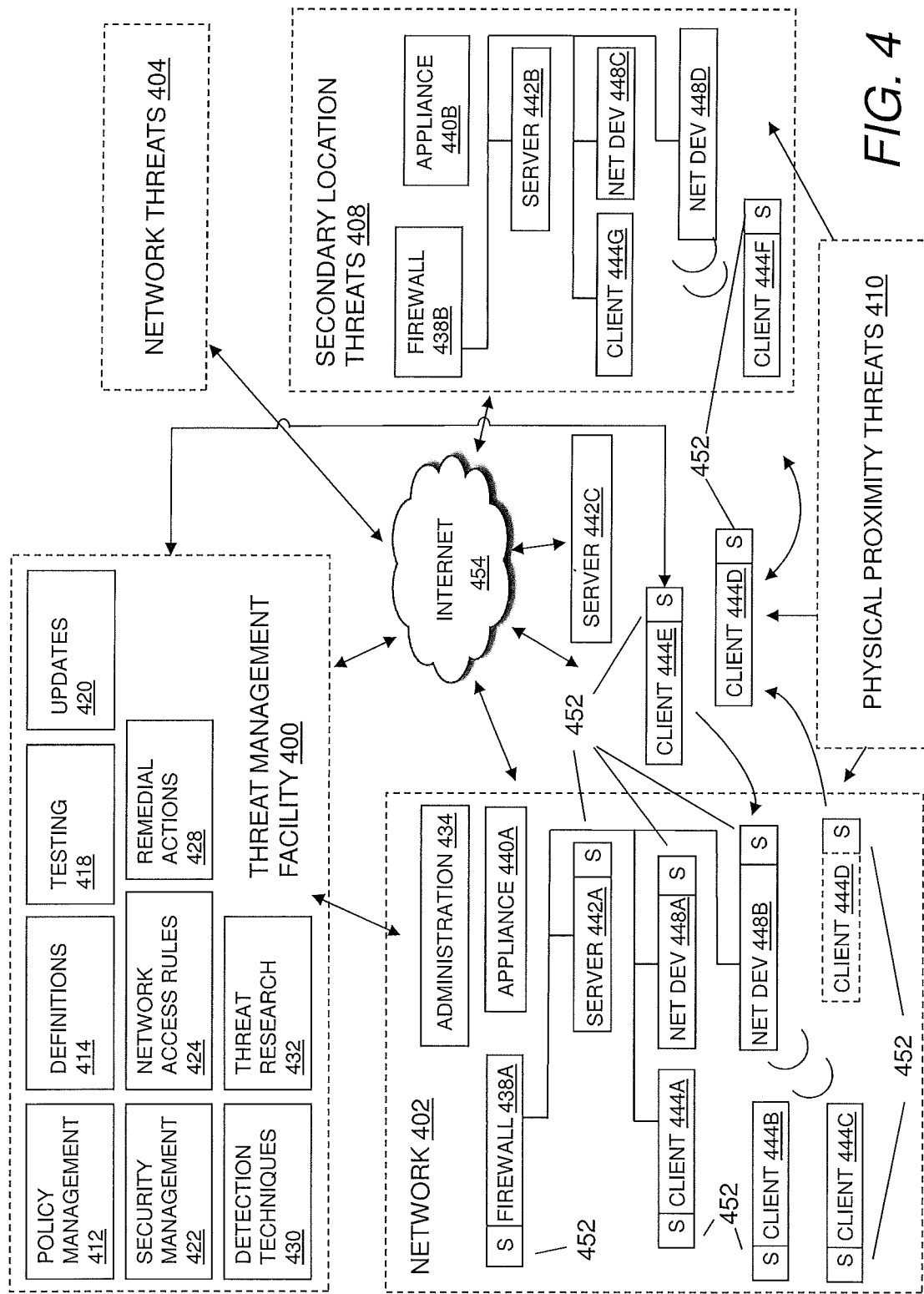
FIG. 4 is diagram of an example environment for threat management.

FIG. 4 illustrates an environment for threat management. Specifically, FIG. 4 depicts a block diagram of a threat management facility 400 providing protection to one or more enterprises, networks, locations, users, businesses, etc. against a variety of threats-a context in which the techniques described above may usefully be deployed. The threat management facility 400 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g. employees, residents, users, guests, etc.) from accessing certain types of applications, devices, resources generally or in a particular manner. Policies may be created, deployed and managed, for example, through the threat management facility 400, which may update and monitor network devices, users, and assets accordingly.

The threat of malware or other compromise may be present at various points within a network 402 such as laptops, desktops, servers, gateways, communication ports, handheld or mobile devices, IoT devices, firewalls. In addition to controlling or stopping malicious code, a threat management facility 400 may provide policy management to control devices, applications, or users that might otherwise undermine productivity and network performance within the network 402.

The threat management facility 400 may provide protection to network 402 from computer-based malware, including viruses, spyware, adware, Trojans, intrusion, spam, policy abuse, advanced persistent threats, uncontrolled access, and the like. In general, the network 402 may be any networked computer-based infrastructure or the like managed by a threat management facility 402, such as an organization, association, institution, or the like, or a cloud-based facility that is available for subscription by individuals. For example, the network 402 may be a corporate, commercial, educational, governmental, or other network 402, and may include multiple networks, computing resources, and other facilities, may be distributed among more than one geographical locations, and may include administration 434, a firewall 438A, an appliance 440A, a server 442A, network devices 448A-B, clients 444A-D, such as IoT devices or other devices. It will be understood that any reference herein to a client or client facilities may include the clients 444A-D shown in FIG. 4 and vice-versa.

The threat management facility 400 may include computers, software, or other computing facilities supporting a plurality of functions, such as security management facility 422, policy management facility 412, update facility 420, a definitions facility 414, network access rules facility 424, remedial action facility 428, detection techniques facility 430, testing facility 418, a threat research facility 432, and the like. In embodiments, the threat protection provided by the threat management facility 400 may extend beyond the network boundaries of the network 402 to include clients 444D (or client facilities) that have moved into network connectivity not directly associated with or controlled by the network 402. Threats to client facilities may come from a variety of sources, such as from network threats 404, physical proximity threats 410, secondary location threats 408, and the like. Clients 444A-D may be protected from threats even when the client 444A-D is not directly connected or in association with the network 402, such as when a client 444E-F moves in and out of the network 402, for example when interfacing with an unprotected server 442C through the Internet 454, when a client 444F is moving into a secondary location threat 408 network such as interfacing with components 440B, 442B, 448C, 448D that are not protected, and the like.

The threat management facility 400 may use or may be included in an integrated system approach to provide network 402 protection from a plurality of threats to device resources in a plurality of locations and network configurations. The threat management facility 400 may also or instead be deployed as a stand-alone solution. For example, some or all of the threat management facility 400 components may be integrated into a server or servers at a remote location, for example in a cloud computing facility. For example, some or all of the threat management facility 400 components may be integrated into a firewall, gateway, or access point within or at the border of the network 402. In some embodiments, the threat management facility 400 may be integrated into a product, such as a third-party product, e.g., through an application programming interface, which may be deployed on endpoints, on remote servers, on internal servers or gateways for a network, or some combination of these.

The security management facility 422 may include a plurality of elements that provide protection from malware to network 402 device resources in a variety of ways including endpoint security and control, email security and control, web security and control, reputation-based filtering, control of unauthorized users, control of guest and non-compliant computers, and the like. The security management facility 422 may include a local software application that provides protection to one or more network 402 devices. The security management facility 422 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 422 may provide email security and control. The security management facility 422 may also or instead provide for web security and control, such as by helping to detect or block viruses, spyware, malware, unwanted applications, and the like, or by helping to control web browsing activity originating from client devices. In an embodiment, the security management facility 422 may provide for network access control, which may provide control over network connections. In addition, network access control may control access to virtual private networks (VPN) that provide communications networks tunneled through other networks. The security management facility 422 may provide host intrusion prevention through behavioral based protection, which may guard against known or unknown threats by analyzing behavior before or while code executes. The security management facility 422 may provide reputation filtering, which may target or identify sources of code.

In embodiments, the security management facility 422 may use wireless characteristics to identify a device on the network 402. For example, the security management facility may determine a reliability index value of device 442-444 connected via a wireless link to the network 402, for example, an Internet-of-Things (IoT) device. Through one or more access points (e.g. firewall 438A) or other sensor (e.g., appliance 440A) in the network 402, the security management facility 422 may monitor RF characteristics of the IoT device to obtain current RF characteristics. The security management facility 422 may compare the current RF characteristics to baseline RF characteristics, and when there is a match between the current RF characteristics and the baseline RF characteristics based on the comparing, adjust the reliability index value to indicate greater reliability, and when there is not a match between the current RF characteristics and the baseline RF characteristics based on the comparing, adjusting the reliability index value to indicate lesser reliability, and when the reliability index value exceeds a threshold value, performing an action to reduce a potential threat of the IoT device to the network. This aspect of the security management facility may also take place on the firewall 438A (e.g., an access point) or appliance 440A.

In general, the security management facility 422 may support overall security of the network 402 using the various techniques described above, optionally as supplemented by updates of malicious code information and so forth for distribution across the network 402.

The administration facility 434 may provide control over the security management facility 422 when updates are performed. Information from the security management facility 422 may also be sent from the enterprise back to a third party, a vendor, or the like, which may lead to improved performance of the threat management facility 400.

The threat management facility 400 may include a policy management facility 412 configured to take actions, such as to block applications, users, communications, devices, and so on based on determinations made. The policy management facility 412 may employ a set of rules or policies that determine network 402 access permissions for a client 444. In an embodiment, a policy database may include a block list, a black list, an allowed list, a white list, or the like, or combinations of the foregoing, that may provide a list of resources internal or external to the network 402 that may or may not be accessed by client devices 444. The policy management facility 412 may also or instead include rule-based filtering of access requests or resource requests, or other suitable techniques for controlling access to resources consistent with a corresponding policy.

In embodiments, the policy management facility 412 may include reliability index thresholds for devices, such as IoT devices. The policy management facility may include policies to permit or deny access, to take remedial action, to issue alerts, and so on based on particular reliability index determinations.

The policy management facility 412 may also or instead provide configuration policies to be used to compare and control the configuration of applications, operating systems, hardware, devices, network associated with the network

402. An evolving threat environment may dictate timely updates, and thus an update management facility 420 may also be provided by the threat management facility 400. In addition, a policy management facility 412 may require update management (e.g., as provided by the update facility 420 herein described). In embodiments, the update management facility 420 may provide for patch management or other software updating, version control, and so forth.

The security facility 422 and policy management facility 412 may push information to the network 402 and/or a given client 444. The network 402 and/or client 444 may also or instead request information from the security facility 422 and/or policy management facility 412, network server facilities 442, or there may be a combination of pushing and pulling of information. In an embodiment, the policy management facility 412 and the security facility 422 management update modules may work in concert to provide information to the network 402 and/or client 444 facility for control of applications, devices, users, and so on.

As threats are identified and characterized, the threat management facility 400 may create updates that may be used to allow the threat management facility 400 to detect and remediate malicious software, unwanted applications, configuration and policy changes, and the like. The threat definition facility 414 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 422 when scanning files or applications within the client facility for the determination of malicious code that may be within the file or application. A definition management facility may include a definition for a neural network or other recognition engine. A definition management facility 414 may provide timely updates of definition files information to the network, client facilities, and the like.

In embodiments, the definition management facility 414 may include default values or baseline values for RF characteristics of devices, such as IoT devices. For example, the definition management facility 414 may include a baseline value for particular RF characteristics of a particular IoT device.

The security management facility 422 may be used to scan an outgoing file and verify that the outgoing file is permitted to be transmitted per the enterprise facility 402 rules and policies. By checking outgoing files, the security management facility 422 may be able to discover malicious code infected files that were not detected as incoming files.

The threat management facility 400 may provide controlled access to the network 402. A network access rules facility 424 may be responsible for determining if a client facility 444 application should be granted access to a requested network resource. In an embodiment, the network access rules facility 424 may verify access rights for client facilities 444 to or from the network 402 or may verify access rights of computer facilities to or from external networks. When network access for a client facility is denied, the network access rules facility 424 may send an information file to the client facility, e.g., a command or command file that the remedial action facility 428 may access and take action upon. The network access rules facility 424 may include one or more databases that may include a block list, a black list, an allowed list, a white list, a reputation list, an unacceptable network resource database, an acceptable network resource database, a network resource reputation database, or the like. The network access rules facility 424 may incorporate rule evaluation. Rule evaluation may, for example, parse network access requests and apply the parsed information to network access rules. The network access rule facility 424 may also or instead provide updated rules and policies to the enterprise facility 402.

When a threat or policy violation is detected by the threat management facility 400, the threat management facility 400 may perform or initiate remedial action through a remedial action facility 428. Remedial action may take a variety of forms, such as terminating or modifying an ongoing process or interaction, issuing an alert, sending a warning to a client or administration facility 434 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 444, quarantining a related application (or files, processes or the like), terminating the application or device, isolating the application or device, moving a process or application code to a sandbox for evaluation, isolating the client facility 444 to a location or status within the network that restricts network access, blocking a network access port from a client facility 444, reporting the application to an administration facility 434, or the like, as well as any combination of the foregoing.

In embodiments, remedial action may be taken based on a reliability index determination based on RF characteristics of a wireless device.

Remedial action may be provided as a result of a detection of a threat or violation. The detection techniques facility 430 may include tools for monitoring the network or managed devices within the network 402. The detection techniques facility 430 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 400 detects threats and violations to established policy, may require the ability to test the system, either at the system level or for a particular computing component. The testing facility 418 may allow the administration facility 434 to coordinate the testing of the security configurations of client facility computing facilities on a network. For example, the administration facility 434 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 434. The administration facility 434 may be able to determine the level of preparedness of the client facility 444 based on the reported information. Remedial action may be taken for any of the client facilities 444 as determined by the administration facility 434.

The threat management facility 400 may provide threat protection across the network 402 to devices such as clients 444, a server facility 442, an administration facility 434, a firewall 438, a gateway, one or more network devices (e.g., hubs and routers 448, a threat management or other appliance 440, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 402, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 102. The endpoint computer security facility 452 may be an application locally loaded onto any corresponding computer platform or computer support component, either for local security functions or for management by the threat management facility 400 or other remote resource, or any combination of these.

The network 402 may include a plurality of client facility computing platforms on which the endpoint computer security facility 452 is installed. A client facility computing platform may be a computer system that is able to access a service on another computer, such as a server facility 442, via a network. The endpoint computer security facility 452 may, in corresponding fashion, provide security in any suitable context such as among a plurality of networked applications, for a client facility connecting to an application server facility 442, for a web browser client facility connecting to a web server facility 442, for an e-mail client facility retrieving e-mail from an Internet 454 service provider's mail storage servers 442 or web site, and the like, as well as any variations or combinations of the foregoing.

The network 402 may include one or more of a variety of server facilities 442, such as application servers, communications servers, file servers, database servers, proxy servers, mail servers, fax servers, game servers, web servers, and the like. A server facility 442, which may also be referred to as a server facility 442 application, server facility 442 operating system, server facility 442 computer, or the like, may be any device(s), application program(s), operating system(s), or combination of the foregoing that accepts client facility connections in order to service requests from clients 444. In embodiments, the threat management facility 400 may provide threat protection to server facilities 442 within the network 402 as load conditions and application changes are made.

A server facility 442 may include an appliance facility 440, where the appliance facility 440 provides specific services to other devices on the network. Simple server facility 442 appliances may also be utilized across the network 402 infrastructure, such as switches, routers, hubs, gateways, print servers, modems, and the like. These appliances may provide interconnection services within the network 402, and therefore may advance the spread of a threat if not property protected.

A client facility 444 may be protected from threats from within the network 402 using a local or personal firewall, which may be a hardware firewall, software firewall, or combination, that controls network traffic to and from a client. The local firewall may permit or deny communications based on a security policy. Another component that may be protected by an endpoint computer security facility 452 is a network firewall facility 438, which may include hardware or software, in a standalone device or integrated with another network component, that may be configured to permit, deny, or proxy data through a network 402.

The interface between the threat management facility 400 and the network 402, and through the appliance facility 440 to embedded endpoint computer security facilities, may include a set of tools that may be the same or different for various implementations, and may allow each network administrator to implement custom controls. In embodiments, these controls may include both automatic actions and managed actions. The administration facility 434 may configure policy rules that determine interactions. The administration facility 434 may also establish license management, which in turn may further determine interactions associated with licensed applications. In embodiments, interactions between the threat management facility 400 and the network 402 may provide threat protection to the network 402 by managing the flow of network data into and out of the network 402 through automatic actions that may be configured by the threat management facility 400 for example by action or configuration of the administration facility 434.

Client facilities 444 within the network 402 may be connected to the network 402 by way of wired network facilities 448A or wireless network facilities 448B. Mobile wireless facility clients 444, because of their ability to connect to a wireless network access point, may connect to the Internet 454 outside the physical boundary of the network 402, and therefore outside the threat-protected environment of the network 402. Such a client 444, if not for the presence of a locally-installed endpoint computer security facility 452, may be exposed to a malware attack or perform actions counter to network 402 policies. Thus, the endpoint computer security facility 452 may provide local protection against various threats and policy violations. The threat management facility 400 may also or instead be configured to protect the out-of-enterprise facility 402 mobile client facility (e.g., the clients 444) through interactions over the Internet 454 (or other network) with the locally-installed endpoint computer security facility 452. Thus mobile client facilities that are components of the network 402 but temporarily outside connectivity with the network 402 may be provided with the threat protection and policy control the same as or similar to client facilities 444 inside the network 402. In addition, mobile client facilities 444 may receive the same interactions to and from the threat management facility 400 as client facilities 444 inside the enterprise facility 402, such as by receiving the same or equivalent services via an embedded endpoint computer security facility 452.

Interactions between the threat management facility 400 and the components of the network 402, including mobile client facility extensions of the network 402, may ultimately be connected through the Internet 454 or any other network or combination of networks. Security-related or policy-related downloads and upgrades to the network 402 may be passed from the threat management facility 400 through to components of the network 402 equipped with the endpoint computer security facility 452. In turn, the endpoint computer security facility 452 components of the enterprise facility 102 may upload policy and access requests back across the Internet 454 and through to the threat management facility 400. The Internet 454 however, is also the path through which threats may be transmitted from their source, and an endpoint computer security facility 452 may be configured to protect a device outside the network 402 through locally-deployed protective measures and through suitable interactions with the threat management facility 400.

Thus, if the mobile client facility were to attempt to connect into an unprotected connection point, such as at a secondary location 408 that is not a part of the network 402, the mobile client facility 444 may be required to request network interactions through the threat management facility 400, where contacting the threat management facility 400 may be performed prior to any other network action. In embodiments, the client facility's 444 endpoint computer security facility 452 may manage actions in unprotected network environments such as when the client facility (e.g., client 444F) is in a secondary location 408, where the endpoint computer security facility 452 may dictate what applications, actions, resources, users, etc. are allowed, blocked, modified, or the like.

The secondary location 408 may have no endpoint computer security facilities 452 as a part of its components, such as its firewalls 438B, servers 442B, clients 444G, hubs and routers 448C-D, and the like. As a result, the components of the secondary location 408 may be open to threat attacks, and become potential sources of threats, as well as any mobile enterprise facility clients 444B-F that may be connected to the secondary location's 408 network. In this instance, these components may now unknowingly spread a threat to other connected to the network 402.

Some threats do not come directly from the Internet 454. For example, a physical proximity threat 410 may be deployed on a client device while that device is connected to an unprotected network connection outside the enterprise facility 402, and when the device is subsequently connected to a client 444 on the network 402, the device can deploy the malware or otherwise pose a threat. In embodiments, the endpoint computer security facility 452 may protect the network 402 against these types of physical proximity threats 410, for instance, through scanning any device prior to allowing data transfers, through security validation certificates, through establishing a safe zone within the network 402 to receive data for evaluation, and the like.

Figure 5:
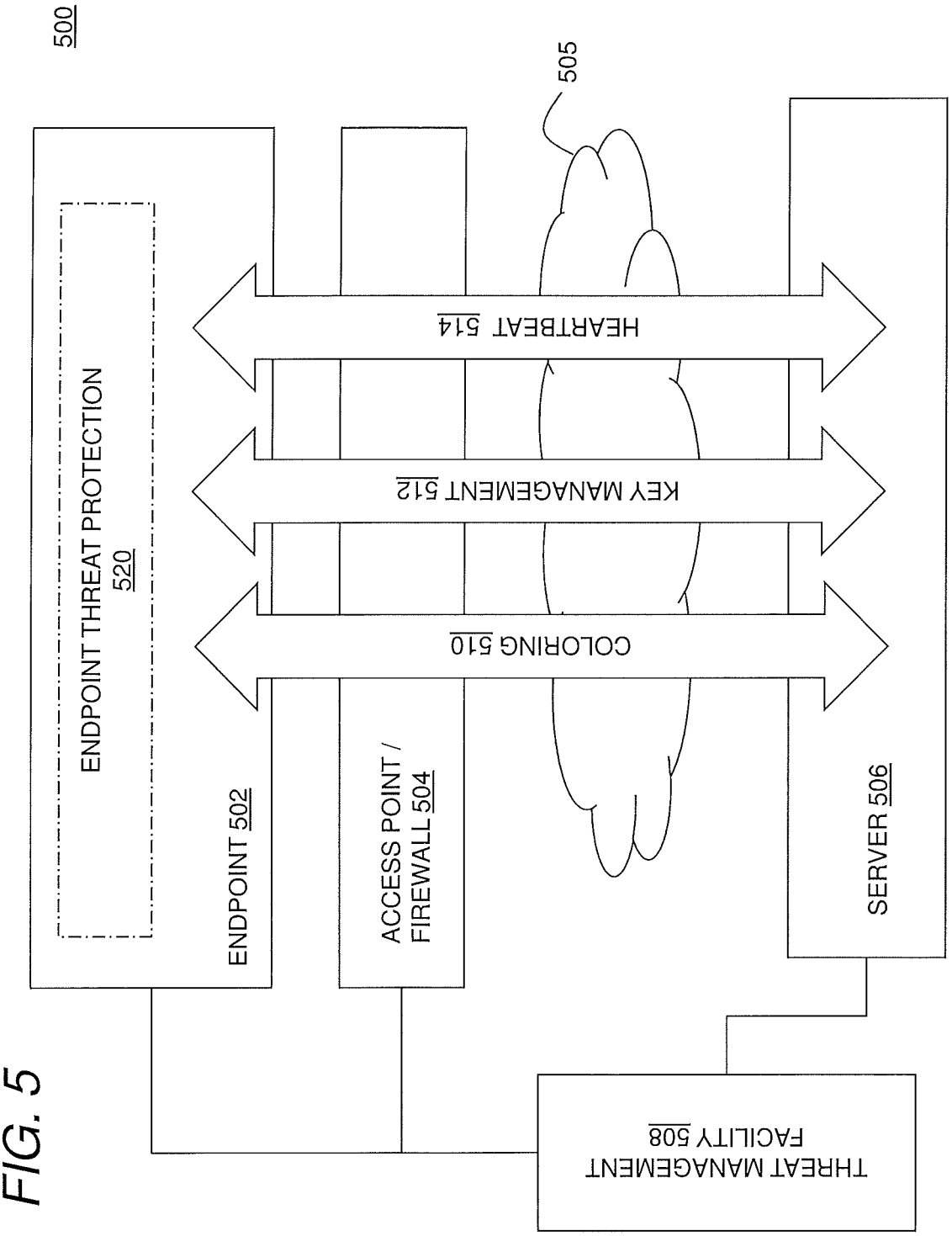
FIG. 5 is a diagram of an exemplary threat management system.

FIG. 5 illustrates an exemplary threat management system 500 as contemplated herein. In general, the threat management system may include an endpoint 502 for example, a laptop, or a device such as an IoT device, an access point 504, a server 506 and a threat management facility 508 in communication with one another directly or indirectly through a data network 505, for example, as generally described above. Each of the entities depicted in FIG. 5, may, for example, be implemented on one or more computing devices such as the computing device described above with reference to FIG. 3.

A number of systems may be distributed across these various components to support threat management, for example, including a coloring system 510, a key management system 512 and a heartbeat system 514, each of which may include software components executing on any of the foregoing system components, and each of which may communicate with the threat management facility 508 or an endpoint threat protection agent 520 executing on an endpoint 502, on an access point or firewall 504, or on a server 506 to support improved threat detection and remediation.

The coloring system 510 may be used to label or 'color' software objects for improved tracking and detection of potentially harmful activity. The coloring system 510 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 510 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 512 may support management of keys for the endpoint 502 in order to selectively permit or prevent access to content on the endpoint 502 on a file-specific basis, a process-specific basis, an application-specific basis, a user-specific basis, or any other suitable basis in order to prevent data leakage, and in order to support more fine-grained and immediate control over access to content on the endpoint 502 when a security compromise is detected. Thus for example, if a particular process executing on the endpoint is compromised, or potentially compromised or otherwise under suspicion, keys to that process may be revoked in order to prevent, e.g., data leakage or other malicious activity. In embodiments, keys on device may be revoked based on one or more reliability index values, the meeting of one or more reliability index thresholds, the rate of change of one or more reliability index values, etc.

The heartbeat system 514 may be used to provide periodic or aperiodic information from an endpoint about system health, security, status, etc. A heartbeat may be encrypted or plaintext, or some combination of these, and may be communicated unidirectionally (e.g., from the endpoint 502 to the threat management facility 508) or bidirectionally (e.g., between the endpoint 502 and the server 506, or any other pair of system components) on a useful schedule.

In implementations, the access point or firewall 504 may use the heartbeat 514 to report a potential or actual compromise of a device based, for example, on a color of the device, or based on one or more reliability index values, the meeting of one or more reliability index thresholds, the rate of change of one or more reliability index values, etc. The heartbeat 514 from the access point 504 may be communicated to a server 506, for example, and administrative server or directly or indirectly to a threat management facility 508. If the endpoint device 502 has an endpoint threat protection facility 520, the facility 520 may be used to further investigate the status, or to take remedial measures, again by communication using the secure heartbeat 514.

In general, these various monitoring and management systems may cooperate to provide improved threat detection and response. For example, the coloring system 510 may be used to evaluate when a particular device is potentially compromised, and a potential threat may be confirmed based on an interrupted heartbeat from the heartbeat system 514. The key management system 512 may then be used to revoke keys to a process so that no further files can be opened, deleted or otherwise modified. More generally, the cooperation of these systems enables a wide variety of reactive measures that can improve detection and remediation of potential threats to an endpoint.

It is, therefore, apparent that there is provided, in accordance with the various embodiments disclosed herein, methods, systems and computer readable media for detecting an IoT security attack using physical communication layer characteristics.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

What is claimed is:

1. A computer implemented method comprising:
identifying a type of an Internet-of-Things (IoT) device coupled via a wireless link to a network;
determining a reliability index value of the IoT device;
selecting one or more radio frequency (RF) characteristics of the IoT device to monitor, wherein the selecting is based on the type of the IoT device;
monitoring, by a wireless network access point of the network, the selected one or more radio frequency (RF) characteristics of the IoT device to obtain current RF characteristics;
comparing the current RF characteristics to baseline RF characteristics, wherein comparing the current RF characteristics to the baseline RF characteristics comprises comparing a rate of change of the selected one or more RF characteristics to a threshold rate, and wherein the threshold rate is based on the type of the IoT device;
when there is a match between the current RF characteristics and the baseline RF characteristics based on the comparing, adjusting the reliability index value to indicate greater reliability;
when there is not a match between the current RF characteristics and the baseline RF characteristics based on the comparing, adjusting the reliability index value to indicate lesser reliability; and
when the adjusted reliability index value meets a threshold value, performing an action to reduce a threat of the IoT device to the network.

2. The method of claim 1, further comprising:
determining the baseline RF characteristics of the IoT device; and
updating the baseline RF characteristics during a time period.

3. The method of claim 2, further comprising:
determining that the type of the IoT device is a stationary device based on a media access control (MAC) address of the IoT device.

4. The method of claim 3, wherein determining that the type of the IoT device is the stationary device further includes accessing a database to determine if a database record corresponding to the media access control (MAC) address of the IoT device indicates that the type of the IoT device is the stationary device.

5. The method of claim 2, wherein determining the baseline RF characteristics includes obtaining the baseline RF characteristics from stored data based on the type of the IoT device.

6. The method of claim 2, wherein determining the baseline RF characteristics includes determining the rate of change of the selected one or more RF characteristics.

7. The method of claim 1, wherein the action includes routing network traffic for the IoT device through a network security device.

8. The method of claim 1, wherein performing the action includes decoupling the IoT device from the network.

9. The method of claim 1, wherein the current RF characteristics include one or more of a received signal strength indicator (RSSI) value, an angle of signal arrival, power save characteristics, service set identifier (SSID) of the network the IoT device is connected to, an access point (AP) the IoT device is connected to, a basic service set identifier (BSSID) associated with the IoT device, a data transmission rate of the IoT device, and data burst rate of the IoT device.

10. A system comprising:
one or more processors coupled to a non-transitory computer readable medium having stored thereon software instructions that, when executed by the one or more processors, cause the one or more processors to perform operations including:
identifying a type of an Internet-of-Things (IoT) device coupled via a wireless link to a network;
determining a reliability index value of the IoT device;
selecting one or more radio frequency (RF) characteristics of the IoT device to monitor, wherein the selecting is based on the type of the IoT device;
monitoring, by a wireless network access point of the network, the selected one or more RF characteristics of the IoT device to obtain current RF characteristics;
comparing the current RF characteristics to baseline RF characteristics, wherein comparing the current RF characteristics to the baseline RF characteristics comprises comparing a rate of change of the selected one or more RF characteristics to a threshold rate, and wherein the threshold rate is based on the type of the IoT device;
when there is a match between the current RF characteristics and the baseline RF characteristics based on the comparing, adjusting the reliability index value to indicate greater reliability;
when there is not a match between the current RF characteristics and the baseline RF characteristics based on the comparing, adjusting the reliability index value to indicate lesser reliability; and
when the adjusted reliability index value meets a threshold value, performing an action to reduce a potential threat of the IoT device to the network.

11. The system of claim 10, wherein the operations further comprise:
determining the baseline RF characteristics of the IoT device; and
updating the baseline RF characteristics during a time period.

12. The system of claim 11, wherein the operations further comprise:
determining that the type of the IoT device is a stationary device based on a media access control (MAC) address of the IoT device.

13. The system of claim 12, wherein determining the IoT device is the stationary device further includes accessing a database to determine if a database record corresponding to a media access control (MAC) address of the IoT device indicates that the type of the IoT device is the stationary device.

14. The system of claim 11, wherein determining baseline RF characteristics includes obtaining baseline RF characteristics from a table based on the type of the IoT device.

15. The system of claim 11, wherein determining the baseline RF characteristics includes calculating a rate of change of the selected one or more RF characteristics.

16. The system of claim 10, wherein the action includes routing network traffic for the IoT device through a network security device.

17. The system of claim 10, wherein performing the action includes decoupling the IoT device from the network.

18. The system of claim 10, wherein the current RF characteristics include one or more of a received signal strength indicator (RSSI) value, an angle of signal arrival, power save characteristics, service set identifier (SSID) of the network the IoT device is connected to, an access point (AP) the IoT device is connected to, a basic service set identifier (BSSID) associated with the IoT device, a data transmission rate of the IoT device, and data burst rate of the IoT device.

19. A nontransitory computer readable medium having stored thereon software instructions that, when executed by one or more processors, cause the one or more processors to perform operations including:
　identifying a type of an Internet-of-Things (IoT) device coupled via a wireless link to a network;
　determining a reliability index value of the IoT device;
　selecting one or more radio frequency (RF) characteristics of the IoT device to monitor, wherein the selecting is based on the type of the IoT device;
　monitoring the selected one or more RF characteristics of the IoT device to obtain current RF characteristics;
　comparing the current RF characteristics to baseline RF characteristics, wherein comparing the current RF characteristics to the baseline RF characteristics comprises comparing a rate of change of the selected one or more RF characteristics to a threshold rate, and wherein the threshold rate is based on the type of the IoT device;
　when there is a match between the current RF characteristics and the baseline RF characteristics based on the comparing, adjusting the reliability index value to indicate greater reliability;
　based on the comparing, adjusting the reliability index value; and
　when the adjusted reliability index value meets a threshold value, performing an action to reduce a threat of the IoT device to the network.

20. The nontransitory computer readable medium of claim 19, wherein the operations further comprise:
　determining the baseline RF characteristics of the IoT device; and
　updating the baseline RF characteristics during a time period.

* * * * *